W. B. DORSEY.
CULTIVATOR.
APPLICATION FILED OCT. 13, 1908.
915,567.
Patented Mar. 16, 1909.
2 SHEETS—SHEET 1.
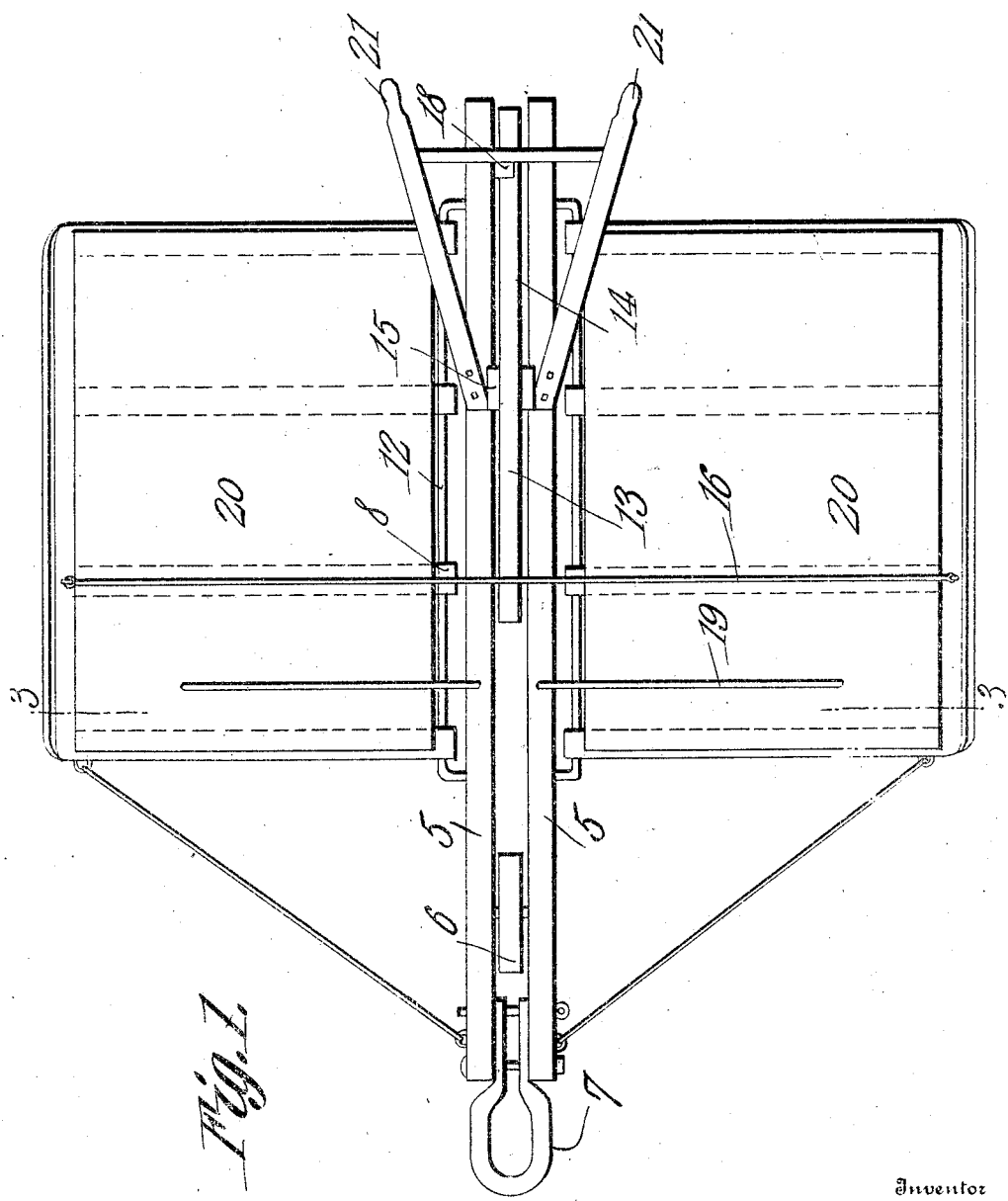
Witnesses
Inventor
William B. Dorsey,
By
Attorneys

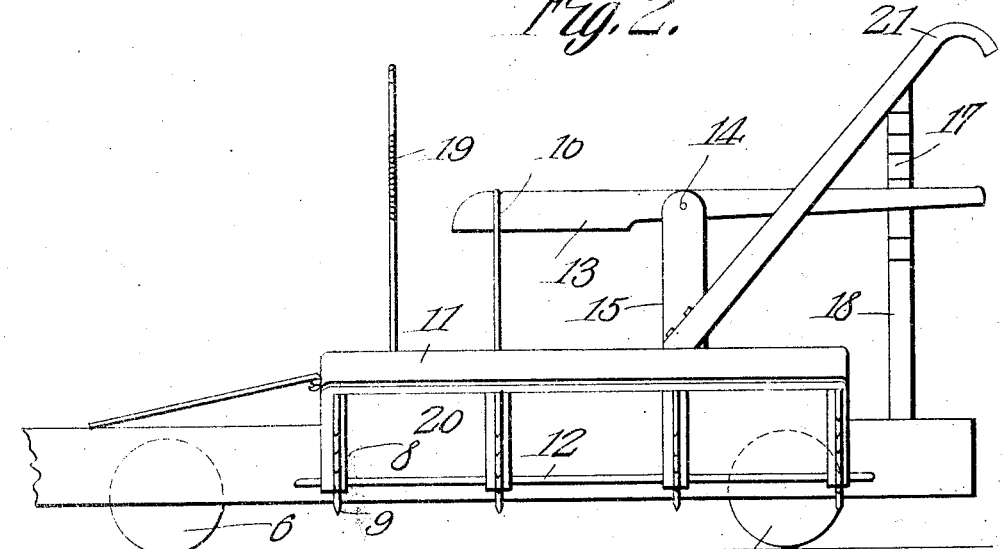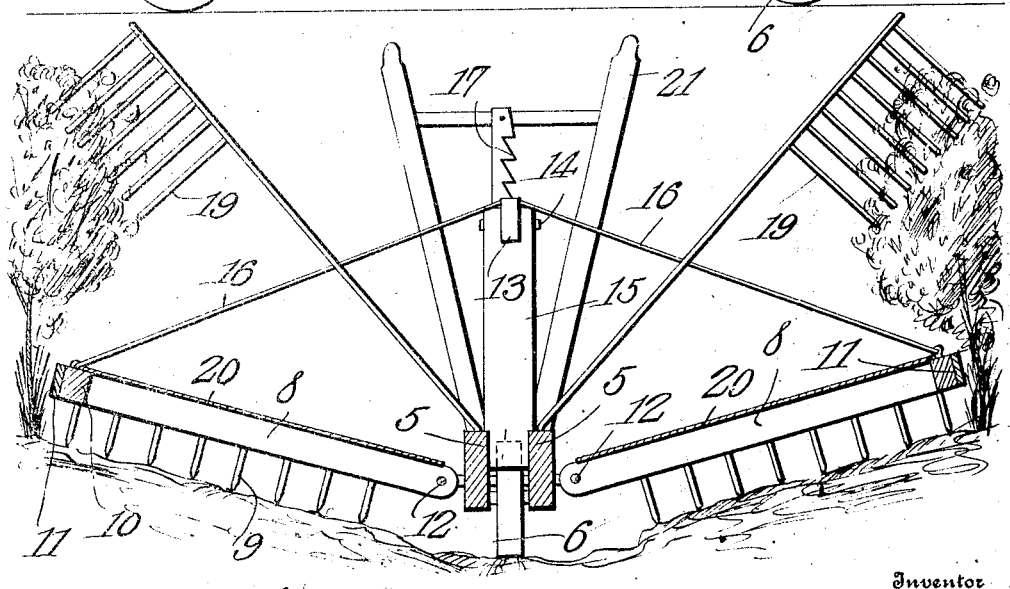

UNITED STATES PATENT OFFICE.

WILLIAM B. DORSEY, OF NATCHEZ, MISSISSIPPI.

CULTIVATOR.

No. 915,567.

Specification of Letters Patent.

Patented March 16, 1909.

Application filed October 13, 1908. Serial No. 457,539.

*To all whom it may concern:*

Be it known that I, WILLIAM B. DORSEY, a citizen of the United States, residing at Natchez, in the county of Adams and State of Mississippi, have invented a new and useful Cultivator, of which the following is a specification.

This invention relates to combined cultivators and insect-destroyers designed more particularly for the cultivation of cotton and the extermination of the boll-weevil.

The object of the present invention is to provide an improved implement of this kind characterized by a wheeled supporting-frame adapted to travel between two rows of plants, and carrying on opposite sides, agitators for knocking the insects off the plants, and vertically swinging frames armed with cultivator teeth, and means to receive the insects knocked off the plants by the brushes.

A further object of the invention is to provide a combined cultivator and insect destroyer which is simple in structure so that it can be operated by unskilled labor, and also to provide an implement of this kind which will operate without injury to the plants.

The invention also has for its object to provide means for adjusting the cultivator according to the slope of the hills.

In the accompanying drawings, Figure 1 is a plan view of the invention. Fig. 2 is a side elevation. Fig. 3 is a transverse section on the line 3—3 of Fig. 1.

The supporting-frame of the implement comprises a pair of spaced longitudinal beams 5 mounted on single wheels 6 located therebetween, at the front and rear ends thereof. At the front end of the beams is a clevis 7 for attachment of the draft animals.

The cultivator is a rectangular frame consisting of transverse bars 8 armed with cultivator teeth 9, and connected at their outer ends by a longitudinal bar 10, the outer edge of which is faced with a strip 11 of leather or other cushioning material to prevent injury to the plants.

Two cultivators as herein described are provided, they extending laterally from opposite sides of the supporting frame. The cultivators are adjustable vertically to suit the slope of the hills, they being pivotally connected to the supporting frame by pivotally mounting the bars 8 at their inner ends on rods 12 carried by the beams 5 and extending along the outer faces thereof.

The cultivator-frames are adjusted vertically and held in adjusted positions by means of a lever 13 fulcrumed at 14 on a post 15 rising from the supporting frame, said lever being connected at one end by lines 16 with the cultivator-frames or wings. The other end of the lever engages rack teeth 17 formed on a post 18 rising from the supporting-frame. The connection 16 is a flexible one so that the cultivator frames may rise and fall and adjust themselves to the slope of the hills, and when traveling to and from the field they may be swung upwardly out of contact with the ground upon operating the lever 13.

Upon the supporting-frame are mounted agitators 19 which extend laterally from opposite sides thereof a sufficient distance to engage the plants as the implement is driven along a row. The cultivator-frames are covered with a sheet-metal plate 20 which is coated with some sticky substance similar to that used on fly-paper. The agitators 19 are located above the plate 20, and the insects knocked off plants fall on the plate and are held thereon by the sticky coating.

At the rear end of the supporting frame are handles 21 for guiding the implement.

The implement herein described effectually serves the purpose for which it is designed. The agitators upon passing over the plants lightly bend them, and as they fly back the insects are dislodged without injury to the plants. The cultivator-wings can be readily raised or lowered to suit the slope of the hill, thus avoiding tearing down loose hills, and also taking the weight of the cultivator frame off the soft soil, and preventing clogging of dirt and weeds, and lessening the draft. The implement can be easily kept in the middle of the row as the arrangement of ground wheels makes it easy to steer, and as it is of light draft it requires only one draft animal.

What is claimed is:—

1. A combined cultivator and insect-destroyer comprising a supporting-frame, vertically adjustable wings extending from opposite sides thereof and armed with cultivator teeth, insect receiving plates covering the wings, and agitators arranged above the said plates.

2. A combined cultivator and insect-destroyer comprising a supporting frame, hinged frames extending from opposite sides thereof, cultivator teeth mounted on said hinged frames, agitators arranged above the same, and an insect receiving plate covering said hinged frames.

In testimony that I claim the foregoing as my own, I have hereto affixed my signature in the presence of two witnesses.

WILLIAM B. DORSEY.

Witnesses:
  WM. D. JENKINS,
  J. D. IRELAND.